G. SOUTHER.
Car-Truck.
No. 207,453. Patented Aug. 27, 1878.
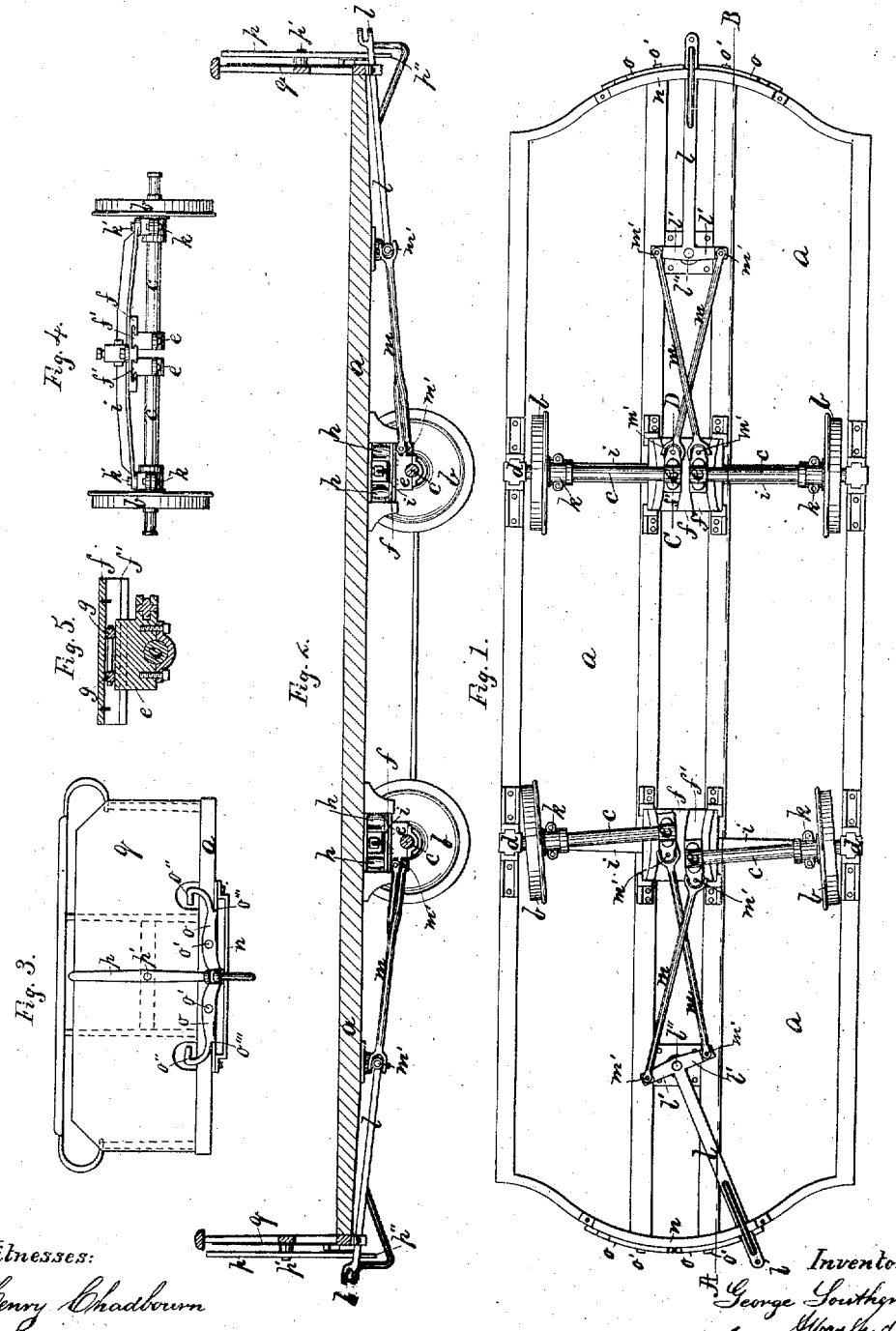
Witnesses:
Henry Chadbourn
Wm. H. Edmands
Inventor:
George Souther

UNITED STATES PATENT OFFICE.

GEORGE SOUTHER, OF BOSTON, MASSACHUSETTS.

IMPROVEMENT IN CAR-TRUCKS.

Specification forming part of Letters Patent No. 207,453, dated August 27, 1878; application filed June 10, 1878.

*To all whom it may concern:*

Be it known that I, GEORGE SOUTHER, of Boston, in the county of Suffolk and State of Massachusetts, have invented a new and useful Improvement in Car-Trucks, which improvement is fully set forth in the following specification, reference being had to the accompanying drawings.

My invention relates to improvements in car-trucks for horse-cars, &c.; and consists of the combination of a pair of centrally-divided shafts for each truck having wheels attached thereto in the usual way, and a coupler-bar provided with swivel-bearings surrounding each of said shaft parts, for the purpose of preventing the wheels in each truck from spreading apart when the car is drawn on curves, as well as for the purpose of keeping the shafts that belong to each truck parallel to each other when the car is in motion.

My invention further consists in combination with divided axles and sliding bearings, as usual on car-trucks, of a central grooved block with sliding bearings, said block being supported on one or more springs, so as to prevent unnecessary shaking and jarring. Anti-frictional rollers are located between the sliding central bearings and the grooved block, as usual, to prevent unnecessary friction, and the links that usually connect the said bearings to the tie-headed draw-bar are provided in both ends with universal joints, by which the draw-bar and links and their bearings can be operated without much friction in case the bearings aforesaid are raised or lowered by the jarring of the car when in motion.

My invention finally consists in the combination, with the usual divided axles and their wheels and central sliding bearings with the links and draw-bar aforesaid, of a draw-bar guide and latches by which the said draw-bar can be locked in any desired position when the car is propelled on a straight or curved track, and, further, with a hand-lever the lower end of which is jointed to the aforesaid draw-bar, for the purpose of operating the latter by hand in case the car is accidentally thrown off the track, in which case the rear truck is so operated by the said lever as to hold it in a proper position for the wheels to be again guided onto the track.

I am aware that car-trucks have heretofore been made with divided axles, sliding bearings, and connections to a double bell-crank lever draw-bar, and I wish to state that I do not claim, broadly, as my invention such an arrangement.

On the accompanying drawings, Figure 1 represents a bottom view of my improved car-trucks. Fig. 2 represents a longitudinal section on the line A B, shown in Fig. 1. Fig. 3 represents an end elevation of the car-frame with the draw-bar and latches. Fig. 4 represents an end view of one of the trucks; and Fig. 5 represents an enlarged cross-section on the line C D, shown in Fig. 1.

Similar letters refer to similar parts wherever they occur on the different parts of the drawings.

$a\,a$ is the car-frame, constructed as usual. Each truck is composed of the wheels $b\,b$, centrally-divided shafts $c\,c$, with their outer bearings, $d\,d$, and inner sliding bearings, $e\,e$. $f$ is the central block, provided with grooves $f'\,f'$, in which the bearings $e\,e$ are free to slide. $g\,g$ are the anti-frictional rollers interposed between the sliding bearings $e\,e$ and central block $f$, for the purpose set forth. $h\,h$ represent the yielding springs interposed between the central block $f$ and the frame, as and for the purpose described. $i$ is the coupler-bar for the shafts $c\,c$, provided in its outer ends with bearings $k\,k$, that are arranged to turn or swivel on the pins or bolts $k'\,k'$ passing through the outer ends of the coupler-bar $i$, as set forth. The bearings $k\,k$ surround the shafts $c\,c$, annular recesses being made on the said shafts for this purpose similar to ordinary journal-bearings. $l$ is the draw-bar, and $l''$ its fulcrum-pin. $l'\,l'$ are the double bell-crank levers or cross-bar on the said draw-bar. $m\,m$ are the connecting-links, by means of which the sliding bearings $e\,e$ are connected to the draw-bar cranks $l'\,l'$, as shown. $m'\,m'\,m'\,m'$ are the universal joints in the ends of the connecting-rods $m\,m$. $n$ is the guide in the end of the frame $a$, in which the outer end of the draw-bar is guided when operated, and $o\,o$ are the latches, hinged at $o'\,o'$, and provided with the toe-pieces $o''\,o''$, by which the driver can unlock either of the said latches by foot-pressure when the car is to be guided on curves $o'''$ $o'''$ are notches on the said latches, so as to temporarily lock the draw-bar in its extreme right or left handed position when the car is drawn on curves. $p$ is the hand-lever, jointed at $p'$ to the dasher $q$, and having its lower end, $p''$, jointed to the forward end of the draw-bar $l$, by which the draw-bar can be operated by hand, so as to move the shafts and sliding bearings, as and for the purpose described.

Having thus fully described the nature and construction of my invention, I wish to secure by Letters Patent, and claim—

1. In combination, the wheels $b\ b$, shafts $c\ c$, bearings $d\ e$, and the coupler-bar $i$, with its swivel-boxes $k\ k'\ k\ k'$, as and for the purpose set forth.

2. In combination, the central grooved block $f f'$ and its sliding bearings $e\ e$, with one or more springs, $h\ h$, as and for the purpose set forth.

3. In combination, the wheels $b\ b$, shafts $c\ c$, sliding bearings $e\ e$, draw-bar $l\ l'\ l'$, and the universally-jointed links $m\ m\ m'\ m'$, all arranged substantially as and for the purpose set forth.

4. In combination, the wheels $b\ b$, shafts $c\ c$, sliding bearings $e\ e$, links $m\ m$, draw-bar $l\ l'\ l'$, the guide $n$, and latches $o\ o''\ o'''$, as and for the purpose set forth.

5. In combination with the draw-bar $l$ and its connections to the sliding bearings $e\ e$, the hand-lever $p\ p'\ p''$, as and for the purpose set forth and described.

GEORGE SOUTHER.

Witnesses:
ALBAN ANDRÉN,
HENRY CHADBOURN.